United States Patent
Masi

[11] 3,794,405
[45] Feb. 26, 1974

[54] LIQUID CRYSTAL CELL AND METHOD FOR ITS MANUFACTURE

[76] Inventor: James Vincent Masi, 36-Belle Vale St., Monroe, Conn. 06468

[22] Filed: Mar. 29, 1973

[21] Appl. No.: 346,101

Related U.S. Application Data

[60] Division of Ser. No. 225,264, Feb. 10, 1972, Pat. No. 3,746,426, which is a continuation of Ser. No. 76,739, Sept. 30, 1970, abandoned.

[52] U.S. Cl. .................................... 350/160 LC
[51] Int. Cl. ................................................ G02f 1/16
[58] Field of Search .......................... 350/160 LC

[56] References Cited
UNITED STATES PATENTS
3,725,899    4/1973    Greubel.......................... 340/324 M
3,730,607    5/1973    Grabmaier et al............ 350/160 LC

*Primary Examiner*—Edward S. Bauer
*Attorney, Agent, or Firm*—F. M. Arbuckle; R. J. Kransdorf

[57] ABSTRACT

A liquid crystal cell and method for its manufacture. The cell has a strip of microglass paper impregnated with liquid crystal material sandwiched between two substrates, each of which has conductive material plated thereon. If coincident selection of a point in the cell is desired, the conductive material on the substrates are in the form of parallel strips with the strip on one substrate being perpendicular to the strips on the other substrate and a layer of non-linear resistance material is deposited over the conductive material on one of the substrates.

4 Claims, 5 Drawing Figures

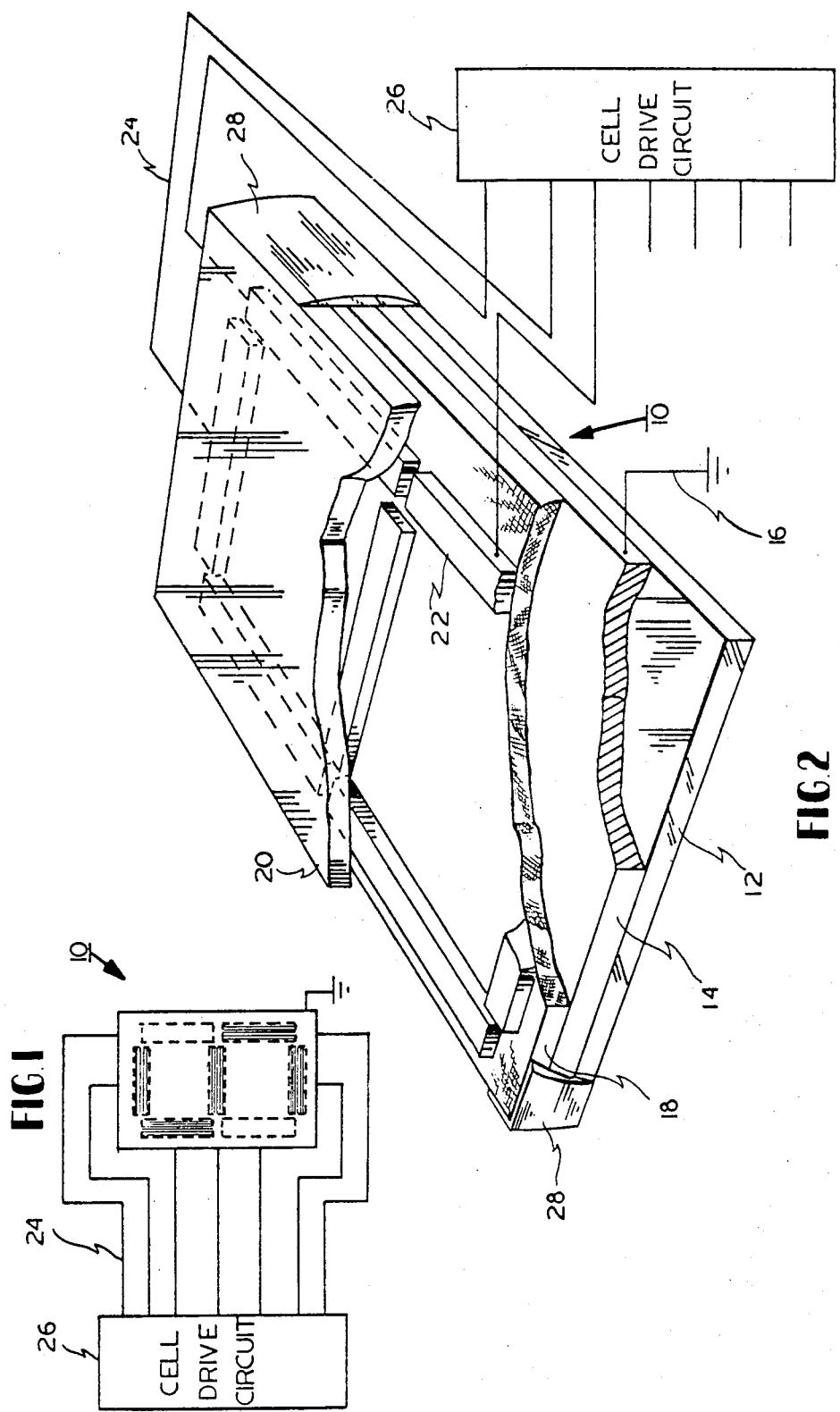

LIQUID CRYSTAL CELL AND METHOD FOR ITS MANUFACTURE

This is a division of application Ser. No. 225,264, filed Feb. 10, 1972 now U.S. Pat. No. 3,746,426, which is a continuation of application Ser. No. 76,739, filed Sept. 30, 1970, and now abandoned.

This invention relates to liquid crystal display cells and more particularly to an improved construction and method of manufacture for such cells including the capability of coincident selection addressing within such a cell.

For many years it has been known that certain classes of liquid crystal compounds, primarily nematic materials (though cholesteric and smectic materials possess some of the same properties), have the property that when an electrical field of sufficient magnitude is impressed across them, the fluid becomes turbulent with its molecules having dipole moments at various angles. This results in a dynamic scattering of light applied to the crystal giving the normally transparent material an opaque appearance. In recent years, attempts have been made to utilize this property of liquid crystal materials for display purposes. Typical liquid crystal cells presently being utilized for this purpose consist of two parallel glass plates with a drop of liquid crystal material sandwiched between them. A thin conductive coating such as tin oxide, on the plates inside surfaces insure a uniform electric field across the cell. Polymeric spacers (Teflon or glass frit, for example) maintain the desired thickness for the active area, this thickness being between 6 and 25 microns. Electrodes attached to each glass plate complete the fabrication.

The construction described above has a number of limitations. First, since the spacers are only along the edge of the cell, it is difficult to maintain uniform spacing between the plates for cells of any appreciable size. This effectively limits the size of liquid crystal cell which can be constructed, and, even for cells of moderate size the separation between the electrodes can vary appreciably leading to uneven illumination of the display. Additional separators placed in the cell would interfere with the capillary retention of the liquid crystal material between the plates. Problems such as those described above make it difficult and expensive to manufacture high-quality uniform liquid crystal cells.

One suggested application for liquid crystal displays has been as a substitute for cathode ray tubes (CRTs) particularly in alpha-numeric display applications. However, in order to achieve the character densities of CRT displays, utilizing a single cell for each index point of a character as is presently done, very small cells would be required. It is both difficult and expensive to fabricate cells of such size. A preferrable means of display would be to provide a cell with coincident selection capability so that a number of index points within the cell might be selectively excited. By making the resolution within each cell small enough, it may be possible to draw pictures, graphs, or any other desired configuration within a single cell or group of cells.

The potential difference, and thus the current, required to cause dynamic scattering to occur within a liquid crystal compound is a function of both the area and thickness of the compound. Thus, if the amount of liquid crystal compound within a liquid crystal cell could be reduced, the current drawn by the cell would likewise be reduced. A means for effecting such a reduction in liquid crystal material without adversely affecting the quality of the display would therefore be desirable.

Finally, a problem which has been primarily responsible for preventing liquid crystal displays from being more widely accepted has been the relatively poor contrast which has been obtainable in these cells. Thus, a need also exists for a means to improve the contrast within liquid crystal cells.

It is thus a primary object of this invention to provide an improved liquid crystal cell and a simplified method for the manufacture thereof.

A more specific object of this invention is to provide a method of manufacturing liquid crystal cells which yields cells of uniform liquid crystal thickness regardless of the cell size.

A further object of this invention is to provide a liquid crystal cell in which a large number of index points may be individually addressed by coincident selection.

Still another object of this invention is to provide a liquid crystal cell with lower circuit requirements without reducing either cell size or display quality.

A still further object of this invention is to provide a liquid rystal cell having an improved contrast ratio.

In accordance with these objects this invention provides a liquid crystal cell which includes first and second flat substrates or plates which are oriented parallel to each other. A means is provided for impressing a potential difference of selected magnitude between at least selected portions of the substrates. A strip of microglass paper such as TISSUGLAS (a trademark of Pallflex Products Corporation) impregnated with liquid crystal material is sandwiched between the substrates and a means is provided for sealing the edges around the strip. If coincident selection addressing is desired, a layer of variable resistance material is provided between the potential applying means for one of the substrates and the microglass paper.

The foregoing and other objects, features and advantages of the invention will be apparent from the following more particular description of preferred embodiments of the invention as illustrated in the accompanying drawings.

In the drawings:

FIG. 1 is a front view and schematic block diagram of a liquid crystal cell of a first embodiment of the invention.

FIG. 2 is a cut-away perspective view of the liquid crystal cell of the first embodiment of the invention.

Figure 3:
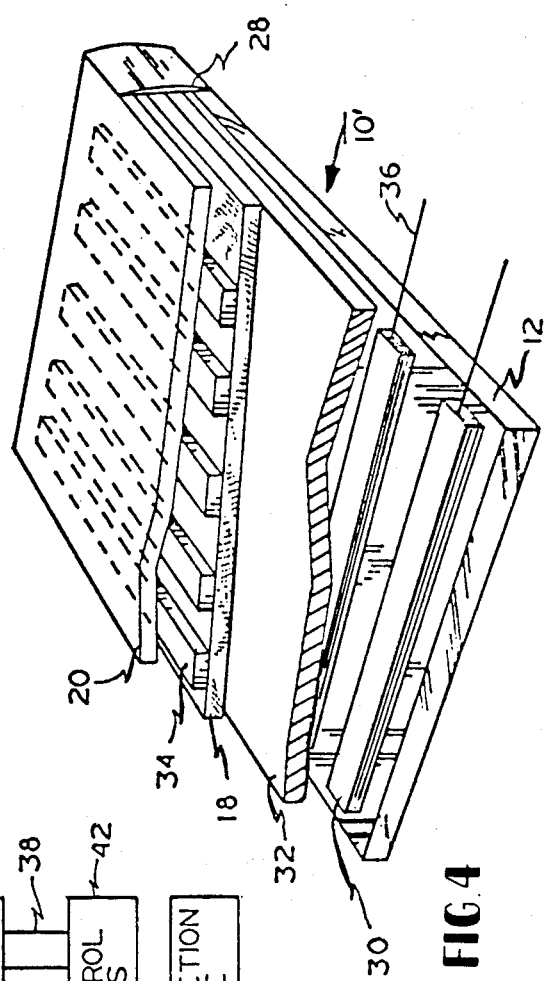
FIG. 3 is a front view and schematic block diagram of a liquid crystal cell of an alternative embodiment of the invention having coincident selection capability.

Referring first to FIG. 2, it is seen that a liquid crystal cell 10 for a first embodiment of the invention consists of a substrate 12, which may for example be a glass plate, with a conductive coating 14 deposited thereon. The coating 14 may be uniform over the surface of plate 12 and can be of a known conductive material such as aluminum. If the cell is to be back lighted, a transparent conductive coating, such as one of tin oxide, would be utilized. This coating would typically be relatively thin, its thickness being for example 0.05 mils. Electrical connection of a lead 16 to this coating may be made by standard printed circuit techniques. The lead 16 is connected to a source of ground potential.

A strip 18 of microglass paper, such as TISSUGLAS, forms the next layer of the cell, the strip of TISSUGLAS being saturated with a liquid crystal compound of, for example, the nematic type. The TISSUGLAS acts like a sponge to hold the liquid crystal material by capillary action. The thickness of the TISSUGLAS strip 18 is determined primarily by the thickness of liquid crystal required for effective display and would normally be about one-half mil. The final element of the display cell sandwich 10 is upper substrate 20 which substrate has conductive material 22 etched or deposited thereon in a predetermined pattern. Substrate 20 and conductive material 22 would be transparent regardless of whether the cell is front or back lighted. For the embodiment of the invention shown in FIGS. 1 and 2, this pattern consists of seven strips which form a standard character matrix utilized to display numeric characters. Each conductive strip 22 has a lead 24 connected to it which lead is energized from a cell drive circuit 26. The drive circuit would typically include a character generator which receives inputs from a keyboard, a transmission line, or directly from a computer and, for most applications, the character output from the generator would be applied through a multiplexing switching network to a number of cells forming a display device. The particular nature of circuit 26 does not form part of the present invention and will therefore not be described further. The final element of cell 10 is a epoxy or glass frit fillet 28 which is applied around the outside of the cell to seal it.

In operation, a positive potential of, for example, 20–50 volts is selectively applied by circuit 26 to leads 24. The liquid crystal material impregnated in TISSUGLAS strip 18 under the conductive strips 22 which have a positive potential applied to them is subjected to a potential difference equal to this positive potential. The resulting changes in the dipole moments of the crystal material in these areas causes dynamic scattering of incident light in these areas giving these areas an opaque appearance. A character, such as for example the numeral 5 shown in FIG. 1, will thus be formed for display in the cell.

Figure 4:
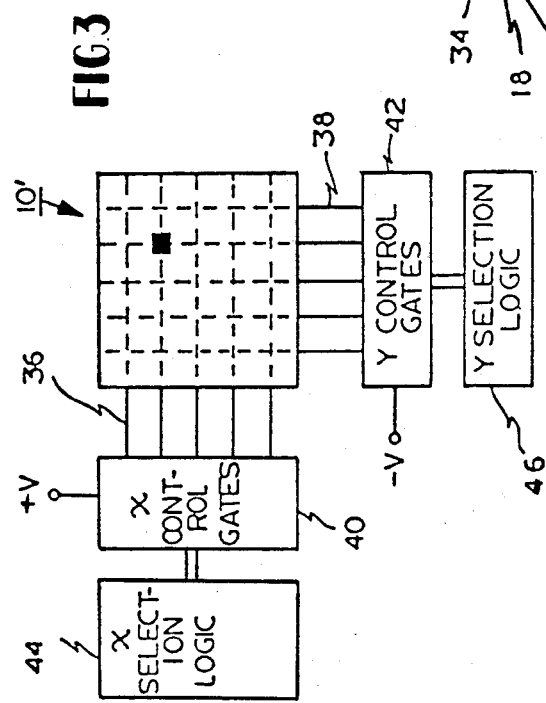
FIG. 4 is a cut-away perspective view of the liquid crystal cell shown in FIG. 3.

In the embodiment of the invention shown in FIGS. 1 and 2, an area of the cell 10 which is to be displayed is selected by applying a potential of predetermined magnitude to an electrode positioned over the selected area. This is practical where the number of areas which are to be addressed within a single cell is relatively small. However, where the number of index points in a single cell is to be relatively large, addressing by coincident selection becomes desirable. FIGS. 3 and 4 illustrate an embodiment of the invention wherein addressing by coincident selection is possible.

Referring now to FIGS. 3 and 4 and using like reference numbers for like elements in the two embodiments of the invention, it is seen that the cell 10 for this embodiment of the invention includes a substrate 12 on which is deposited or etched a plurality of parallel conductive strips 30. The number and width of these strips would vary with the application with five horizontal strips being shown by way of illustration in the figures. As with ground strip 14 in FIG. 1, the strips 30 could be of aluminum or some other conducting material and would be in the order of 0.01 mil thick. A key element in the embodiment of FIGS. 3 and 4 is a coating for layer 32 of a non-linear resistance material such as silicon carbide in a plastic binder which is deposited over the conductive strips 30. The material of layer 32 has the property of presenting a virtual open circuit to signals having a potential less than a predetermined voltage constant value $V_c$ and of presenting uniform potential drop of $V_c$ to signals having a potential exceeding $V_c$. The value $V_c$ required for this application will be discussed shortly. The thickness for non-linear resistance layer 32 would typically be about 1 mil. A strip of liquid-crystal impregnated microglass paper is laid over coating 32 and the cell 10 is completed by a substrate 20 having transparent conductive strips 34 deposited and/or etched on its underside. Strips 34 are oriented perpendicular to the strips 30 with their number and width again depending on application. Five strips have been shown for purposes of illustration. Strips 34 would be of the same material and thickness as strips 22 in FIG. 2. Electrical leads 36 and 38 are connected by standard printed circuit techniques to the strips 30 and 34 respectively with the leads 36 being connected to horizontal or X control gates 40 and the leads 38 being connected to vertical or Y control gates 42. X and Y selection logic 44 and 46 respectively are provided to selectively energize one X and one Y gate at any given time to apply a positive or negative potential respectively to the corresponding conductive strip.

In operation, assume that it is desired to cause the spot shown in FIG. 3 to be opaque. Under these conditions, logic 44 would apply a signal to enable the second of the gates 40 causing a positive potential to be applied to the second of the lines 36, and logic 46 would apply a signal to enable the fourth of the gates 42 permitting a negative signal to be applied to the corresponding fourth vertical line 38. For purposes of this discussion it will be assumed that 50 volts are required across the liquid crystal material in order to obtain sufficient dynamic scattering for high contrast display and that $V_c$ for the non-linear resistance material of layer 32 is also 50 volts. Thus, if the positive and negative voltages on the lines 36 and 38 respectively are also 50 volts, most of this potential drop will be dissipated in the non-linear resistance layer at index points along a strip 30 or 34 where coincidence does not occur. However, at the intersection of two strips having signals applied to them, a 100 volt potential difference will exist. Since only 50 volts of this potential difference will appear across the non-linear resistance material the desired 50 volt potential will appear across the liquid crystal material resulting in dynamic scattering of light at the selected index point. Since the potential required to obtain optimum dynamic scattering in the liquid crystal material is a function of the thickness of the liquid crystal layer, the input potentials and $V_c$ may be reduced by decreasing the thickness of the microglass paper layer. If the liquid crystal material is of the type having storage characteristics, or if a number of index points in a selected pattern are sequentially energized at a rate which is faster than the decay time of the liquid crystal material, a display having the selected pattern may be maintained in the cell.

Figure 5:
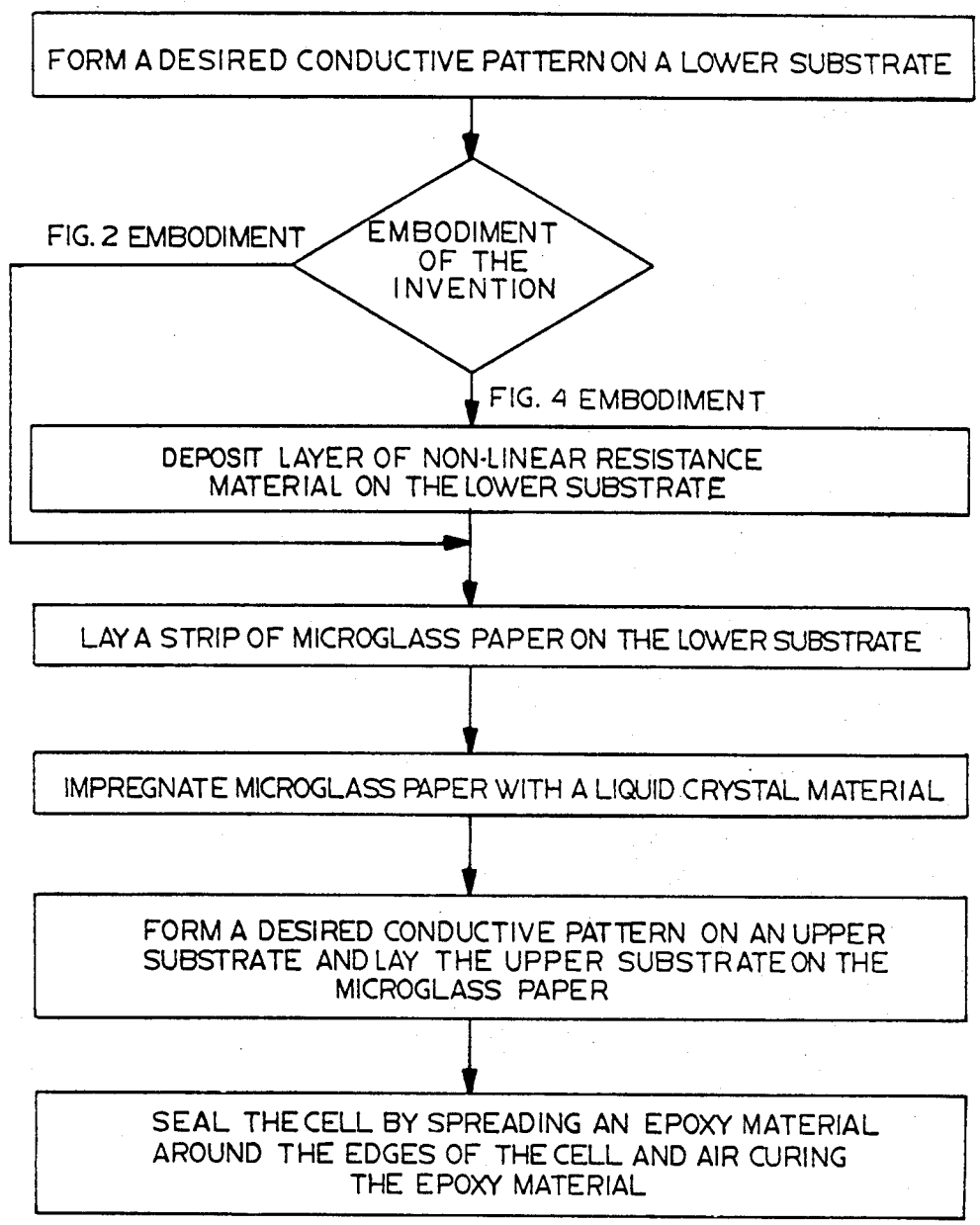
FIG. 5 is a flow diagram of a method of manufacturing the cells shown in FIGS. 1–4.

The method of manufacturing liquid crystal display cells of the type described above will now be described with reference to the flow diagram of FIG. 5. The first step is to deposit, etch and/or otherwise form the desired conductive pattern on lower substrate 12. The electrical connections required to this substrate may also be made during this step. The desired conductive pattern for the upper substrate 20 is similarly formed. If a cell of the type shown in FIG. 4 is being formed, the next step is to deposit a layer of variable resistance material on the lower substrate utilizing standard printed circuit techniques such as screening or spraying. This step would, of course, be bypassed if a cell of the type shown in FIG. 2 is being fabricated. A strip of microglass paper such as TISSUGLAS, of proper size and thickness is then laid on the lower substrate and is impregnated with the liquid crystal material. The impregnating may be done by placing a capillary tube such as an eye-dropper filled with liquid crystal material on a surface of the microglass paper or a pinch seal input-glass to metal part and permitting the microglass paper to absorb as much of the liquid crystal material as it can. The upper substrate which has the desired conductive pattern formed on it is then laid on the impregnated microglass paper and the cell is sealed by spreading an epoxy material or glass frit seal around the edges of the cell. The epoxy material is air cured completing the assembly operation. If glass frit is used, it is sealed in the conventional way by local firing.

From the above it is apparent that the thickness of the liquid crystal material over the entire area of the cell is controlled by the thickness of the microglass paper strip which thickness may easily be controlled to be uniform over the entire area. Uniform thickness of liquid crystal material is thus assured. Further, the capillary retention of the liquid crystal material within the microglass paper is easily obtained as contrasted with the difficulty of achieving capillary retention between the glass plates in existing liquid crystal cell manufacturing. The manufacture of the cells is thus substantially simplified. Further, since a portion of the space between the plates is taken up by the microglass paper material the total amount of liquid crystal material required for a cell is reduced. As was indicated previously, this reduction in liquid crystal material results in a corresponding reduction in the current requirements of the cell. This reduces the cells power requirements and thus decreases the cost of operation. The microglass paper can by dyed a dark color to yield a dark surrounding which provides for higher contrast in the liquid crystal cell than is presently obtainable. Finally, a simple mechanism has been provided through the use of a non-linear resistance layer to permit coincident selection of index points within a liquid crystal cell thus permitting a higher density of index points than is presently obtainable.

While specific materials and dimensions have been indicated in the description above, it will be understood that these are provided by way of example only and that other materials or dimensions suitable for the intended functions may be utilized. Thus, while the invention has been particularly shown and described with reference to preferred emboidments thereof, it will be understood by those skilled in the art that the foregoing and other changes in form and details may be made therein without departing from the spirit and scope of the invention.

What is claimed is:

1. A liquid crystal cell comprising:
   first and second flat substrates, said substrates being oriented parallel to each other;
   first parallel electrically conducting strips oriented in a first direction secured to the inside of one of said substrates;
   second parallel electrically conducting strips oriented perpendicular to said first strips and secured to the inside of the other of said substrates;
   a layer of non-linear resistance material secured between said substrates; said non-linear resistance material having a voltage constant value $Vc$ such that the non-linear resistance material presents a virtual open circuit to signals having a potential less than $Vc$ and presents a uniform potential drop of $Vc$ to signals having a potential exceeding $Vc$;
   a layer of liquid crystal material secured between said substrates; and
   means for selectively applying signals of opposite polarity to said first and second strips, the difference between the magnitude of a signal applied to one of said strips and the voltage constant value $Vc$ for the non-linear resistance layer adjacent thereto being insufficient to cause the liquid crystal material adjacent the strip to become opaque, the combined magnitude of the signals at the intersection of a first and second strip having signals applied thereto being sufficiently greater than $Vc$ to cause the liquid crystal layer at said intersection to become opaque.

2. A cell of the type described in claim 1 wherein said non-linear resistance material is silicon carbide in a plastic binder.

3. A cell of the type described in claim 1 wherein the electrically conductive material for at least one of said substrates is transparent.

4. A cell of the type described in claim 1 wherein the signals applied to said first and second strips are of like magnitude, said magnitude being substantially equal to $Vc$.

* * * * *